United States Patent Office 3,755,467
Patented Aug. 28, 1973

3,755,467
TETRACHLORO ARYL DIETHERS
Gerhard Darsow, Krefeld-Uerdingen, Ludwig Bottenbruch, Krefeld-Bockum, and Hermann Schnell, Krefeld-Uerdingen, Germany, assignors to Bayer Aktiengesellschaft, Leverkusen, Germany
No Drawing. Original application Aug. 12, 1968, Ser. No. 752,173, now abandoned. Divided and this application Jan. 25, 1971, Ser. No. 109,713
Claims priority, application Germany, Aug. 18, 1967, P 16 43 344
Int. Cl. C07c 43/22
U.S. Cl. 260—613 R    3 Claims

ABSTRACT OF THE DISCLOSURE

The invention is concerned with novel halogen-containing arylethers or polyethers and the process for the production thereof.

---

This application is a division of application Ser. No. 752,173, filed Aug. 12, 1968 and now abandoned.

It has been found that alkali metal phenolates react in the presence of a strongly polar inert organic solvent at an elevated temperature, preferably at about 120 to about 160° C., not only, as is known, with aromatic compounds containing halogen atoms which are attached to the aromatic ring and are activated by electron-attracting groups, such as nitro, nitroso and sulphone groups, to form the corresponding aryl ethers (cf. U.S. Pat. No. 3,032,594 and the Dutch patent application published under No. 6408130) but also with trihalobenzenes, whereby one halogen atom reacts and is replaced with an aryl ether group.

The object of the present invention, therefore, comprises novel halogen-containing aryl ethers or polyethers and a process for the production thereof by the reaction of 1 mol of a n-valent alkali metal phenolate with about $n$ mols of a trihalobenzene in the presence of a strongly polar inert organic solvent at an elevated temperature.

The aryl ethers which can be obtained by this process correspond to the formula

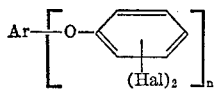

in which Ar denotes a mono- or polynuclear, n-valent aromatic radical, Hal is fluorine, chlorine, bromine or iodine, and $n$ is an integer from 1 to about 20.

The preferred trihalobenzenes are trichlorobenzenes, but its is also possible to use the corresponding fluorine, bromine and iodine compounds.

Numerous variations are possible when selecting the phenols. Mono- and polyvalent phenols can be reacted. Suitable monophenols are, for example, the phenol, the cresols, the dialkyl phenols, such as the dimethyl, the diethyl, the dipropyl and the dibutyl phenols, and halogenated phenols such as mono-, di-, tri-, tetra- and pentahalogen phenols. In the case of bi- or higher-valent phenols, the hydroxyl groups may be attached either to the same nucleus (e.g. hydroquinone, resorcinol, pyrogallol, phloroglucinol) or to different nuclei (e.g. 4,4'-dihydroxy-diphenyl, bis-hydroxy-naphthalenes, bis-(hydroxyphenyl)-alkanes, -ethers, -sulphides, -sulphones, trisphenols, etc.). They may stand in the o-, m- or p-position to one another. There may further be mentioned phenols of the resole type, i.e. the condensation products of monophenols with formaldehyde, as well as e.g. polymers of isopropenyl-phenols and copolymers of isopropenyl-phenols with other polymerisable monomers (cf. e.g. German patent specification No. 1,153,527). Besides the hydroxyl group, the aromatic nucleus concerned may contain additional inorganic or organic substituents, with the limitation, that spatially large substituents in a position adjacent to the hydroxyl groups must not impair the reactivity of the latter by steric or any other hindrance.

All elements of the first main group of the Periodic System are suitable for the production of the phenolates. Sodium and potassium hydroxide are preferred for reasons of economy.

Examples of suitable polar organic solvents are dimethyl sulphoxide, diethyl sulphoxide, dimethyl-sulphone, diethyl-sulphone, diisopropyl-sulphone and tetramethyl-sulphone.

The alkali metal phenolates can be prepared by dissolving the phenol in a sufficient amount of the strongly polar organic solvent to be used for the subsequent reaction, adding the stoichiometric amount of alkali metal hydroxide in solid form or in an aqueous solution, and heating the mixture at about 120–160° C. for some time, e.g. 4–6 hours, thus distilling off from the mixture the water which is present or liberated during the phenolate formation, expediently with the addition of an entraining agent, such as benzene or toluene. When the removal of water is completed, the entraining agent is distilled off.

To the cooled, practically anhydrous solution of the phenolate in the strongly polar organic solvent there is subsequently added the stoichiometric amount of trihalobenzene, expediently dissolved in the same solvent. The condensation proper is then carried out by heating this mixture at the aforesaid reaction temperatures, for example, for 3–4 hours. The alkali metal halide formed is thus precipitated as an insoluble salt and separated.

After cooling, the solution can be mixed with water, whereupon the reaction product separates in solid or liquid form and can be isolated. However, it is also possible to obtain the reaction product by distilling off the polar solvent and subsequent fractionation of the residue in a vacuum.

The process can be further simplified by allowing the phenolate formation and the condensation reaction to proceed simultaneously, instead of successively. For this purpose, stoichiometric amounts of the phenol and trihalobenzene are dissolved in the strongly polar organic solvent, the stoichiometric amounts of alkali metal hydroxide and the entraining agent are added, and the mixture is slowly heated to the reaction temperature. The water which is present and which is formed during the phenol formation is thus easily and rapidly distilled off as an azeotrope with the entraining agent, the alkali metal hydroxide formed is precipitated as an insoluble salt and can be removed by filtration when the reaction is completed. The reaction time then amounts only to about 4–6 hours in all.

The haloaryl ethers so obtained can be used as insulating agents in electro-industry and as flame-proofing agents or plasticisers for synthetic materials. For instance, the haloaryl ethers are incorporated in amounts of about 5 to 15% by weight into mixtures of (a) ethylenically unsaturated polyesters of glycols and dicarboxylic acids including ethylenically unsaturated dicarboxylic acids such as maleic acid and (b) monomers that are copolymerisable with said polyesters to produce cross-linked insoluble products.

EXAMPLE 1

3,5-dichloro-diphenyl ether

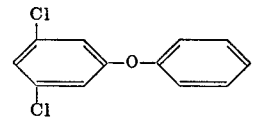

145.2 g. (0.8 mole) 1,3,5-trichlorobenzene and 75.3 g. (0.8 mole) phenol are placed into a glass flask of 1 litre capacity and dissolved in 600 ml. dimethyl sulphoxide (DMSO). The glass flask is fitted with gas feed tube, stirrer, thermometer, reflux condenser and water receiver. A slow nitrogen current is passed through the apparatus, and 32.0 g. (0.8 mole) sodium hydroxide in solid form (or the equivalent water-containing product) and 100 ml. toluene are added. The reaction mixture so obtained is heated at 130–140° C. for about 5 hours, the water contained in the mixture and the water resulting from the phenolate formation being continuously distilled off with toluene as azeotrope. The toluene is recycled via the water separator. At the same time, the sodium chloride which is formed during the condensation and is insoluble in DMSO is precipitated. When the water has been completely removed from the mixture, the sodium chloride is filtered off and the liquid phase is subjected to distillation. The toluene is first distilled off under normal pressure, then the dimethyl sulphoxide and residues of unreacted starting compounds under reduced pressure. The remaining reaction product is expediently also purified by distillation. A colourless liquid of boiling point 377° C./764 mm. Hg is obtained. The yield is about 94% of theory.

EXAMPLE 2

2,5-dichloro-diphenyl ether

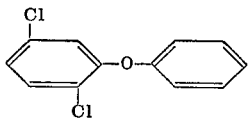

75.3 g. (0.8 mole) phenol, dissolved in 600 ml. dimethyl sulphoxide and 100 ml. toluene, are heated with 51.7 g. (0.8 mole) potassium hydroxide (86.9%) in an apparatus according to Example 1 at 140° C. for 4 hours, the water present in the reaction system and the water resulting from the phenolate formation being continuously distilled off with toluene as entraining agent. When the water has been completely removed from the mixture, the toluene is distilled off. The mixture is allowed to cool, and 145.2 g. (0.8 mole) 1,2,4-trichlorobenzene dissolved in 100 ml. dimethyl sulphoxide are added. The mixture is then heated at 130° C. for 5 hours whereupon DMSO-insoluble potassium chloride is rapidly precipitated. When the reaction is completed, the reaction mixture is poured into 3000 ml. of water which has been acidified with sulphuric acid. The ether separates as a heavy oil and can easily be separated. It is purified by vacuum distillation. A colourless liquid of boiling point 306–307° C./762 mm. Hg is obtained. The yield is about 88% of theory.

EXAMPLE 3

145.2 g. (0.8 mole) 1,2,3-trichlorobenzene and 75.3 g. (0.8 mole) phenol are dissolved in 600 ml. dimethyl sulphoxide in an apparatus according to Example 1 and heated with 32.0 g. (0.8 mole) sodium hydroxide and 100 ml. benzene at 120–130° C. for 6 hours, the water present and the water resulting from the phenolate formation being distilled off with benzene as azeotrope. When the water has been completely removed from the reaction mixture, the benzene is distilled off and the precipitated sodium chloride is filtered off. The remaining liquid is distilled in a vacuum. After removal of the DMSO, a colourless liquid of boiling point 105–106° C./0.1 mm. Hg is obtained. The yield is about 88% of theory. The product is a mixture of isomers consisting of 54% 2,6-dichlorodiphenyl ether and 46% 2,3-dichloro-diphenyl ether.

EXAMPLE 4

1,4-bis-(3,5-dichloro-phenoxy)-benzene

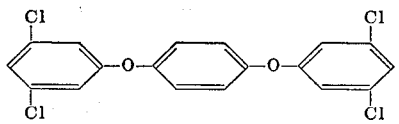

44.0 g. (0.4 mole) hydroquinone and 145.2 g. (0.8 mole) 1,3,5-trichlorobenzene are dissolved in 500 ml. dimethyl sulphoxide in an apparatus according to Example 1 and heated with 51.6 g. of 87% potassium hydroxide (0.8 mole) and 100 ml. toluene at 150° C. for 5 hours, the water being eliminated. When the water has been completely removed from the reaction mixture the toluene is distilled off and the reaction mixture is subsequently poured in 3000 ml. of acidified water. The ether is thus precipitated in the form of a dirty-white powder. This is filtered off with suction, washed until neutral, and dried. After drying, the product is dissolved in dioxan and decolourized by the addition of active charcoal. Some water is then carefully added, and the ether is thus precipitated in the form of a white powder which is collected in a suction filter and subsequently dried. The substance so obtained melts at 130–131° C. The yield amounts to 127 g.

EXAMPLE 5

3,5-dichloro-2′,6′-dimethyl-diphenyl ether

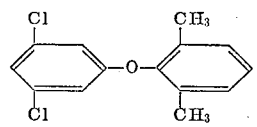

61.1 g. (0.5 mole) 2,6-dimethyl-phenol dissolved in 400 ml. dimethyl sulphoxide are reacted in an apparatus according to Example 1 with 20.0 g. (0.5 mole) sodium hydroxide to form the corresponding sodium phenolate, the water liberated during the salt formation being removed from the reaction mixture by distillation. 90.7 g. (0.5 mole) 1,3,5-trichlorobenzene are subsequently added to the solution, the mixture is heated at 150° C. for 6 hours, and the resultant ether is then precipitated by pouring the reaction product into 2000 ml. of acidified water. A white to grey-white powder is obtained, which can be recrystallised from methanol for complete purification. Fine white crystals of melting point 100–101° C. are obtained. The yield amounts to 123 g.

EXAMPLE 6

2,2-bis[4-(3,5-dichloro-phenoxy)-phenyl]-propane

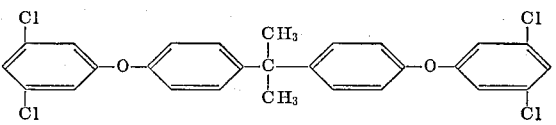

114.1 g. (0.5 mole) 2,2-bis-(4-hydroxyphenyl)-propane are dissolved in 600 ml. dimethyl sulphoxide and reacted with 40.0 g. (1 mole) sodium hydroxide to form the corresponding disodium salt by heating the mixture at 150–160° C. while substantially distilling off the water liberated during the salt formation. A solution of 181.5 g. (1 mole) 1,3,5-trichlorobenzene in 150 ml. toluene is subsequently added, the residual water is distilled off with the toluene, and the mixture is subsequently heated at 140° C. for 6 hours. The mixture is then poured into 3000 ml. of water. The ether separates in the form of heavy yellow-brown drops. It is taken up with methylene chloride and separated from the aqueous phase. The solution is dried over sodium sulphate and decolourized by adding active charcoal with stirring. The methylene chloride is then distilled off, and 218 g. of a pale yellow resinous substance are obtained.

*Elementary analysis.*—Calc. (percent): C, 62.6; H, 3.9; O, 6.2; Cl, 27.3. Found (percent): C, 62.4; H, 4.0; O, 6.4; Cl, 27.1.

EXAMPLE 7

3,5,4'-trichloro-diphenyl ether

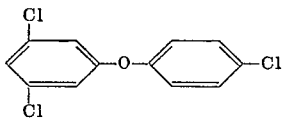

64.28 g. (0.5 mole) p-chlorophenyl, 90.7 g. (0.5 mole) 1,3,5-trichlorobenzene and 20.0 g. (0.5 mole) sodium hydroxide are dissolved in 600 ml. dimethyl sulphoxide in an apparatus according to Example 1 and, after the addition of 150 ml. toluene, heated at 140° C. for 6 hours. During this operation, the water resulting from the phenolate formation is continuously distilled off from the reaction mixture with the toluene. When the water has been removed from the mixture, the precipitated sodium chloride is filtered off and the liquid phase is subjected to a vacuum distillation. At first, the dimethyl sulphoxide distils over, then the unreacted starting material, and subsequently the trichlorodiphenyl ether formed. 118 g. of a colourless liquid of boiling point 108–110° C./0.06 mm. Hg are obtained.

What is claimed is:
1. An aryl diether of the formula

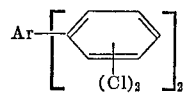

wherein Ar is phenylene or

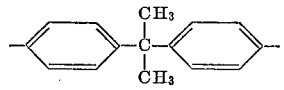

2. 1,4-bis-(3,5-dichlorophenyloxy)-benzene.
3. 2,2-bis-[4-(3,5-dichlorophenoxy)-phenyl]-propane.

References Cited

UNITED STATES PATENTS

| | | | |
|---|---|---|---|
| 3,532,759 | 10/1970 | Schnell et al. | 260—613 R |
| 3,358,040 | 12/1967 | McMahon | 260—613 R |
| 3,567,783 | 3/1971 | Brown | 260—613 R |
| 3,567,781 | 3/1971 | Clark | 260—613 R X |

BERNARD HELFIN, Primary Examiner

U.S. Cl. X.R.

260—612 R, 609 F, 607 A, 33.2 R, 45.95; 262—8.1, 65